United States Patent [19]

Pawlowski et al.

[11] Patent Number: 4,836,851

[45] Date of Patent: Jun. 6, 1989

[54] DYES CONTAINING POLYHYDROXYL GROUPS FOR INK-JET PRINTING INKS

[75] Inventors: Norman E. Pawlowski; Steven J. Bares; Loren E. Johnson; Suraj L. Hindagolla, all of Corvallis, Oreg.

[73] Assignee: Hewlett-Packard Company, Palo Alto, Calif.

[21] Appl. No.: 155,175

[22] Filed: Feb. 11, 1988

[51] Int. Cl.$^4$ ............................................. C09D 11/00
[52] U.S. Cl. ...................................... 106/22; 106/20; 106/23
[58] Field of Search ............................. 106/20, 22, 23

[56] References Cited

U.S. PATENT DOCUMENTS

| 4,666,519 | 5/1987 | Akiyama et al. | 106/22 |
| 4,703,113 | 10/1987 | Baxter et al. | 106/22 |
| 4,705,567 | 11/1987 | Hair et al. | 106/22 |
| 4,726,844 | 2/1988 | Greenwood | 106/22 |
| 4,735,657 | 4/1988 | Baxter et al. | 106/22 |
| 4,738,721 | 4/1988 | Baxter et al. | 106/22 |

*Primary Examiner*—Amelia B. Yarbrough
*Attorney, Agent, or Firm*—William J. Bethurum

[57] ABSTRACT

A dye used in ink compositions for ink-jet printing comprises an aromatic dye molecule having attached to the backbone thereof from one to four polyhydroxyl-substituted groups having the formula selected from the group consisting of:

(a) $CH_2OH\text{-}(CHOH)_nCH_2O\text{-}$, where $n=2$ to 10;
(b) $O_{n-1}C_nH_{2n-1}\text{-}O\text{-}$, where $n=5$ to 7; and
(c) $C_{6n}H_{5n+1}O_{5n}\text{-}O\text{-}$, where $n=1$ to about 100. These dyes have improved water solubility and improved interaction with paper.

9 Claims, No Drawings

DYES CONTAINING POLYHYDROXYL GROUPS FOR INK-JET PRINTING INKS

TECHNICAL FIELD

The present invention relates to dyes in ink compositions for ink-jet printing, and, more particularly, to dyes incorporating multiple polyhydroxyl groups to improve the dye solubility and print quality.

BACKGROUND ART

Water-soluble dyes are commonly used for ink-jet printers in the form of a composition comprising the dye, water, and a water miscible organic solvent, such as a glycol ether. A typical composition comprises water and ethylene glycol in equal proportions and up to about six percent of a dye such as Food Black 2. The amount of dye is determined by the density of the print required. Such compositions are formulated to have, among other things, the viscosity and surface tension required for the ink-jet printing process. In addition, an important feature of such a composition is that the dye must have good water solubility, not only to provide the required print density, but also to avoid precipitation of the dye in the ink-jet nozzles to form a crust which blocks the nozzle. The latter problem arises when some of the water in the ink composition contained in the nozzle evaporates and the dye precipitates from solution to leave a crust in the nozzle. Over a period of time, this crust builds and causes partial and subsequently full blockage of the nozzle.

One approach to solving this problem has been to incorporate sulfonate groups, $SO_3$, in the dye with the associated cation, such as sodium, potassium, lithium, ammonium, and amine salt cations. Such dyes are described, for example, in U.S. Pat. No. 4,557,761. However, dyes with good water solubility generally have three disadvantages with regard to their interaction with paper. First, such dyes are easily smeared on contact by fingers or any moisture. Second, they interact poorly with paper, which causes them to migrate into the paper with the dye's solvents to give poor, diffuse print quality. Finally, the failure of these dyes to interact with and bind to the paper causes inks formed from these dyes to have longer dry times.

Thus, a need exists in the industry for a dye suitable for use in ink-jet printing, which has good water solubility, while at the same time being able to interact strongly with paper.

DISCLOSURE OF THE INVENTION

The general purpose of the present invention is to provide new and improved dyes for use in ink compositions for ink-jet printing in which the dye possesses good water solubility and good interaction with paper. These dyes possess most, if not all, of the advantages of the above prior art dyes while overcoming their above-mentioned significant disadvantages.

The above general purpose of the present invention is accomplished by providing new dyes in which the aromatic dye molecule has attached to the backbone thereof from one to four polyhydroxyl-substituted groups having the formula selected from the group consisting of:

(a) $CH_{20}OH\text{-}(CHOH)_nCH_2O-$, where n=2 to 10;
(b) $O_{n-1}C_nH_{2n-1}-O-$, where n=5 to 7; and
(c) $C_{6n}H_{5n+1}O_{5n}-O-$, where n=1 to about 100.

Accordingly, it is a further object of the present invention to provide processes for forming the above-described dyes.

Another object of the present invention is to provide ink compositions comprising the above-described dyes.

Yet another object of this invention is to provide dyes for ink-jet printing which have sufficient water solubility to avoid the formation of crust in the ink-jet nozzle.

Another object of this invention is to provide dyes for ink-jet printing which have improved water-fastness, smear-resistance, and drying times.

A further object of the present invention is to provide dyes for ink-jet printing which form a sharp, high density image.

The foregoing and other advantages and features of the present invention will become more readily apparent from the following more particular description of the preferred embodiments of the invention.

BEST MODES FOR CARRYING OUT THE INVENTION

The dyes in accordance with the present invention are formed by attaching to the backbone of an aromatic dye molecule from one to four polyhydroxyl-substituted groups having the formula selected from the group consisting of:

(a) $CH_2OH\text{-}(CHOH)_nCH_2O-$, where n=2 to 10;
(b) $O_{n-1}C_nH_{2n-1}-O-$, where n=5 to 7; and
(c) $C_{6n}H_{5n+1}O_{5n}-O-$, where n=1 to about 100.

The term "polyhydroxyl-substituted group" or "polyhydroxyl group" is used herein to designate the group formed by removal of one hydrogen atom from a polyhydroxyl-substituted molecule to leave an ether linkage by which the group is attached to the dye molecule.

The compounds having formula (a) above are derived from polyhydroxyl-substituted alkane molecules, such as sorbitol, adonitol, and threitol and the optical isomers thereof, namely, mannitol, arabitol, and erythritol, respectively.

The compounds having formula (b) above are derived from polyhydroxyl-substituted cycloaliphatic molecules, alternatively referred to as cyclopolyhydroxy molecules, such as inositol and ribitol. These cyclic compounds may be more effective for the purpose of the present invention than the aliphatic counterparts due to the lower entropy change on redissolving (smearing) for the cycloaliphatics.

The compounds having formula (c) above are derived from saccharides and polysaccharides, such as glucose, fructose, gluconic acid, and glucaric acid, as well as trehalose and raffinose.

Formula (a) represents open chain polyols such as sorbitol (n=6). Formula (b) represents cyclic polyols, with n=5 (ribitol) and n=6 (inositol) readily available from commercial sources at reasonable cost. Formula (c) represents saccharides with n=1 to very large n (n≈100). These saccharides are available from natural sources, with n=1, 2, 3 well described with common names such as glucose, fructose (n=1), sucrose, trehalose (n=2), and raffinose (n=3). Amylopectin is a polysaccharide with n equal to a large and variable value depending on the source and method of isolation of this large water soluble polysaccharide; partial hydrolysis to lower values of n (n≈50 to 100) are preferred for ink-jet ink applications.

The term "backbone" of the dye molecule is used herein to refer to the carbon skeleton giving the molecule its basic shape and, more particularly, to indicate the ring structure comprising the chromophore.

The polyhydroxyl groups are highly hydrated in water and, thus, function as solubilizing groups when attached to a dye molecule which has otherwise limited water solubility. Each polyhydroxyl group added to the dye molecule further increases its water solubility. It has been found that a dye molecule with from one to four polyhydroxyl groups attached to the backbone thereof has excellent water solubility. Due to the good water solubility of these dyes, the prior art problem of crusting and blockage of the ink-jet printer nozzle is avoided by the present invention.

Furthermore, the polyhydroxyl groups bind strongly to paper at the point of contact when applied in a drop of ink to provide improved print quality. In addition, the strong interaction of the polyhydroxyl groups with paper provides improved water fastness and smear resistance of the ink composition containing these dyes. Moreover, by appropriate choice of the solvent system in which the dye of the present invention is used, a composition can be provided which has improved dry time due to the dye's ability to bind to the paper while the solvent spreads quickly into the paper to produce a good dot with a sharp edge and reduced size.

Typical aromatic dye molecules which may be altered in accordance with the present invention to incorporate polyhydroxyl groups include, but are not limited to, Reactive Black 1, Reactive Black 31, Black MX-CWA, Solvent Black 2, Direct Black 19, C.I. Reactive Blue 19, Reactive Blue 4, Reactie Blue 7, Reactive Blue 81, Reactive Red 1, Reactive Red 4, Reactive Red 17, Reactive Red 24, Reactive Yellow 1, Reactive Yellow 2, Reactive Yellow 3, and Acid Yellow 66.

The dye molecule must contain reactive groups which are : (1) capable of being directly coupled to a polyhydroxyl group by an ether linkage; or (2) capable of forming an intermediate reactive dye which reacts with the polyhydroxyl compound or derivative thereof; or (3) capable of reacting with a derivative of the polyhydroxyl compound to effect the polyhydroxyl addition to the dye molecule.

The dyes in accordance with the present invention may be formed by reacting a coupling agent, such as cyanuric chloride, with the nucleophilic groups on a solvent-soluble, non-reactive dye, such as Solvent Black 2, to form an intermediate reactive dye, which is then coupled to a polyhydroxyl compound, such as sorbitol. Such a reaction is conducted under basic conditions between 20° C. and 100° C. in a polar anhydrous solvent, such as dimethyl sulfoxide, acetone, pyridine, N-methyl-2-pyrrolidone, dimethyl formamide, sulfolane, dimethoxyethane, or propylene carbonate. Optionally, a non-reactive dye may be reacted with cyanuric acid to form a reactive dye comprising a triazine chloride group, which is then coupled to the polyhydroxyl compound.

Alternatively, the polyhydroxyl compound, such as sorbitol, may be directly coupled with a reactive dye, such as C.I. Reactive Blue 19, Reactive Blue 4, Reactive Blue 81, Reactive Red 1, Reactive Red 17, or Acid Yellow 66. The reaction is conducted under basic conditions, between 20° C. and 100° C. or preferably in an anhydrous solvent, such as those mentioned immediately above, with pyridine added as a base. These particular dyes noted above contain sulfonate groups which are known to act as solubilizers. It has been found that the polyhydroxyl groups of the present invention are compatible with these sulfonate groups and the two groups can be incorporated in the same dye molecules in accordance with the present invention. The resulting dye molecule exhibits improved water solubility due to the combination of the polyhydroxyl and sulfonate groups and improved interaction with paper due to the polyhydroxyl groups.

The dyes in accordance with the present invention may be formed by yet another process in which one of the hydroxyl groups of the polyhydroxyl compound is converted to a leaving group, such as p-toluenesulfonate, and a nucleophilic group on the dye molecule links directly to the polyhydroxyl group by displacing the leaving group. An example of a polyhydroxyl derivative compound useful for this purpose is the diacetal-p-toluene-sulfonate ester of a sugar. This latter compound is described in the Journal of the Chemical Society, 1961, at page 1643.

In use, the dyes in accordance with the present invention are incorporated in an ink composition comprising the present dye, water, and a water miscible organic solvent. Preferably, the dye is present in the amount of about 2 to 12 percent by weight of the composition. The organic solvent, may comprise, for example, diethylene glycol, triethylene glycol, polyethylene glycol, propylene glycol, monomethyl ether, 1,2-dimethoxypropane, an alcohol such as methanol, sulfolane, formamide, N-methyl-2-pyrrolidone, propylene carbonate, oxidipropionitrile, or mixtures thereof. Water and the organic solvent are preferably present in the amounts of about 96 to 50 percent and about 4 to 50 percent, respectively.

The practice of the present invention is described in greater detail in the Examples herein.

INDUSTRIAL APPLICABILITY

The polyhydroxyl-containing dyes in accordance with the present invention find use in ink compositions for ink-jet printing.

EXAMPLE 1

This example illustrates one method for the preparation of dyes in accordance with the present invention.

To 18.2 grams of sorbitol dissolved in 130 ml water containing 3 grams lithium hydroxide, there was slowly added 12 grams of Reactive Black 1 while stirring rapidly. After completion of the addition, the mixture was further stirred for 1 hour while heating to 90° C. The excess reactants were then separated by reverse osmosis while keeping the pH approximately constantly 9 by the addition of acetic acid. The dye was further purified on an ion exchange column.

Ultraviolet spectrometry showed the chromophore of the dye molecule was essentially intact, while thin layer chromatography showed the purity of the product.

This procedure was repeated using Procion Black MX-CWA and comparable results were obtained. This general procedure will work for any reactive dye. For non-reactive dyes, a triazine chloride group is first attached to the dye by reacting the dye with cyanuric chloride. Then, the procedure described above is followed.

This dye had excellent water fastness on paper as discussed in Example 2.

EXAMPLE 2

This example illustrates the formation and testing of a dye composition in accordance with the present invention.

A dye composition was prepared from 2.5 to 5 g of the dye prepared in Example 1 and dissolved in a solvent comprising 30 g formamide and 70 g water. The following waterfastness tests were performed:

(1) wipe across a print with wet, "standard", mechanical thumb and look for smear;

(2) mark over with high-lighter, porous tip marker and look for smear; and (3) print on paper, full fill graphics (or 100% fill black-out at 360 dots per inch, 120 to 140 picoliter drops), with a ink-jet printer. A one inch by one inch block of printing was then stirred in a beaker containing 400 ml water for 5 minutes, followed by measuring the blackness, or loss of blackness, as measured with a standard meter which measures L.*A.*B.* coordinates.

The control for these waterfastness test was the reactive dye reacted with water only.

The dye in accordance with the present invention exhibited excellent waterfastness on paper, by all three tests.

Thus, the present invention provides a new dye for ink-jet printing that produces a sharp, high density image that is water-fast and smear-resistant, and has sufficient water solubility to avoid the formation of crust in ink-jet nozzles.

Having thus described exemplary embodiments of the present invention, it should be noted by those skilled in the art that the disclosures within are exemplary only and that various other alternatives, adaptations, and modifications may be made within the scope of the present invention.

What is claimed is:

1. An ink composition suitable for use in ink-jet printing comprising:
    (a) a vehicle comprising about 96 to 50 percent water and about 4 to 50 percent water-miscible organic solvent; and
    (b) a dye comprising an aromatic dye molecule having attached to the backbone thereof from one to four polyhydroxyl-substituted groups having the formula selected from the group consisting of:
    (1) $CH_2OH\text{-}(CHOH)_nCH_2O\text{---}$, where $n=2$ to 10;
    (2) $O_{n-1}C_nH_{2n-1}\text{---}O\text{---}$, where $n=5$ to 7; and
    (3) $C_{6n}H_{5n+1}O_{5n}\text{---}O\text{---}$, where $n=1$ to about 100.

2. The ink composition of claim 1 wherein said dye is present in the amount of about 2 to 12 percent by weight of said vehicle.

3. The ink composition of claim 1 wherein said dye comprises an aromatic dye molecule selected from the group consisting of Reactive Black 1, Reactive Black 31, Black MX-CWA, Solvent Black 2, Direct Black 19, C.I. Reactive Blue 19, Reactive Blue 4, Reactive Blue 7, Reactive Blue 81, Reactive Red 1, Reactive Red 4, Reactive Red 17, Reactive Red 24, Reactive Yellow 1, Reactive Yellow 2, Reactive Yellow 3, and Acid Yellow 66.

4. The ink composition of claim 1 wherein said polyhydroxyl-substituted group is derived from a compound selected from the group consisting of sorbitol, mannitol, adonitol, arabitol, threitol, erythritol, inositol, ribitol, glucose, fructose, sucrose, trehalose, raffinose, gluconic acid, glucaric acid, and amylopectin.

5. The ink composition of claim 1 wherein said organic solvent is selected from the group consisting of diethylene glycol, triethylene glycol, polyethylene glycol, propylene glycol, monomethyl ether, 1,2-dimethoxypropane, methanol, formamide, sulfolane, N-methyl-2pyrrolidone, propylene carbonate, and oxidipropionitrile.

6. The ink composition of claim 1 wherein said organic solvent and said water are present in substantially equal proportions.

7. An ink composition of claim 1 wherein the polyhydroxyl-substituted groups on the backbone of the dye molecule have the formula $CH_2OH\text{-}(CHOH)_nCH_2O\text{---}$, where $n=2$ to 10.

8. An ink composition of claim 1 wherein the polyhydroxyl-substituted groups on the backbone of the dye molecule have the formula $O_{n-1}C_nH_{2n-1}\text{---}O\text{---}$, where $n=5$ to 7.

9. An ink composition of claim 1 wherein the polyhydroxyl-substituted groups on the backbone of the dye molecule have the formula $C_{6n}H_{5n+1}O_{5n}\text{---}O\text{---}$.

* * * * *